Dec. 6, 1966 Y. BRAULT ETAL 3,290,679

PULSE STRETCHING AND COMPRESSION METHODS AND SYSTEMS

Filed May 8, 1961 2 Sheets-Sheet 1

PULSE STRETCHING AND COMPRESSION METHODS AND SYSTEMS

Filed May 8, 1961 2 Sheets-Sheet 2

United States Patent Office 3,290,679

Patented Dec. 6, 1966

3,290,679

PULSE STRETCHING AND COMPRESSION METHODS AND SYSTEMS

Yves Brault, Roland Carre, and Roger Cheminant, Paris, France, assignors to Compagnie Generale de Telegraphie Sans Fil, a corporation of France Filed May 8, 1961, Ser. No. 108,674
Claims priority, application France, May 11, 1960, 826,829
10 Claims. (Cl. 343—17.2)

The present invention relates to methods and systems for stretching and compressing pulses or providing long duration pulses capable of subsequent compression by means of a given dispersive filter.

It is an object of the invention to provide an improved method and an improved system of the above type.

It is another object of the invention to provide radar systems incorporating the above method and system.

As is known, dispersive filters are filters which affect the signal components propagating therethrough with a phase-shift, whose magnitude depends upon their respective frequencies, while presenting a substantially constant attenuation in the whole of the operating frequency band.

One known compression device, which may be used with pulses built up by trains of constant amplitude oscillations, which are linearly frequency modulated between two limit angular frequencies $(\omega_0-\Delta\omega/2)$ and $(\omega_0+\Delta\omega/2)$, comprises a dispersive filter the phaseshift characteristic of which is a function of the second degree, $\varphi_0(\omega)$, of the angular frequency $\omega$.

Examples of such a dispersive filter, more generally referred to as a compression filter, when it is only used in the conventional manner for compressing pulses, are given, for instance, in "Pulse Compression—Key to More Efficient Radar Transmission," by Charles E. Cook (Proc. IRE, March 1960, pages 310 to 316).

However, the degree of compression increases with $\Delta\omega$ and the fact that it is rather difficult to provide dispersive filters presenting a phaseshift characteristic $\varphi_0(\omega)$ in a broad frequency band, sets a limit to this method.

The same difficulties would arise with long duration pulses modulated according to a different law. The compression of these pulses into very short pulses by propagating them through a dispersive filter always requires the phaseshift characteristic of the filter to be adapted to the modulation law of the long duration pulses.

The method according to the invention has among others the advantage of being applicable with dispersive filters whose phase characteristic is not critical, i.e. with filters of comparatively simple structure and capable to be used within a wide frequency range. In addition, it is possible to use the filter only once, i.e. for obtaining one long duration pulse and the filter is then constantly available for reception purposes.

The method of the invention comprises the steps of sending an initial short duration pulse through a dispersive filter expanding it into a long duration pulse, storing or recording the latter, reading the stored pulse in a direction reverse of that of recording, and propagating the long duration pulse through the same dispersive filter to compress it, thus obtaining a pulse which is identical to the initial one, except that it is reversed with respect to time, its beginning corresponding to the end of the initial pulse and vice-versa.

The invention will be best understood from the following description and appended drawings, wherein.

Figures 1, 2, 5, 6:
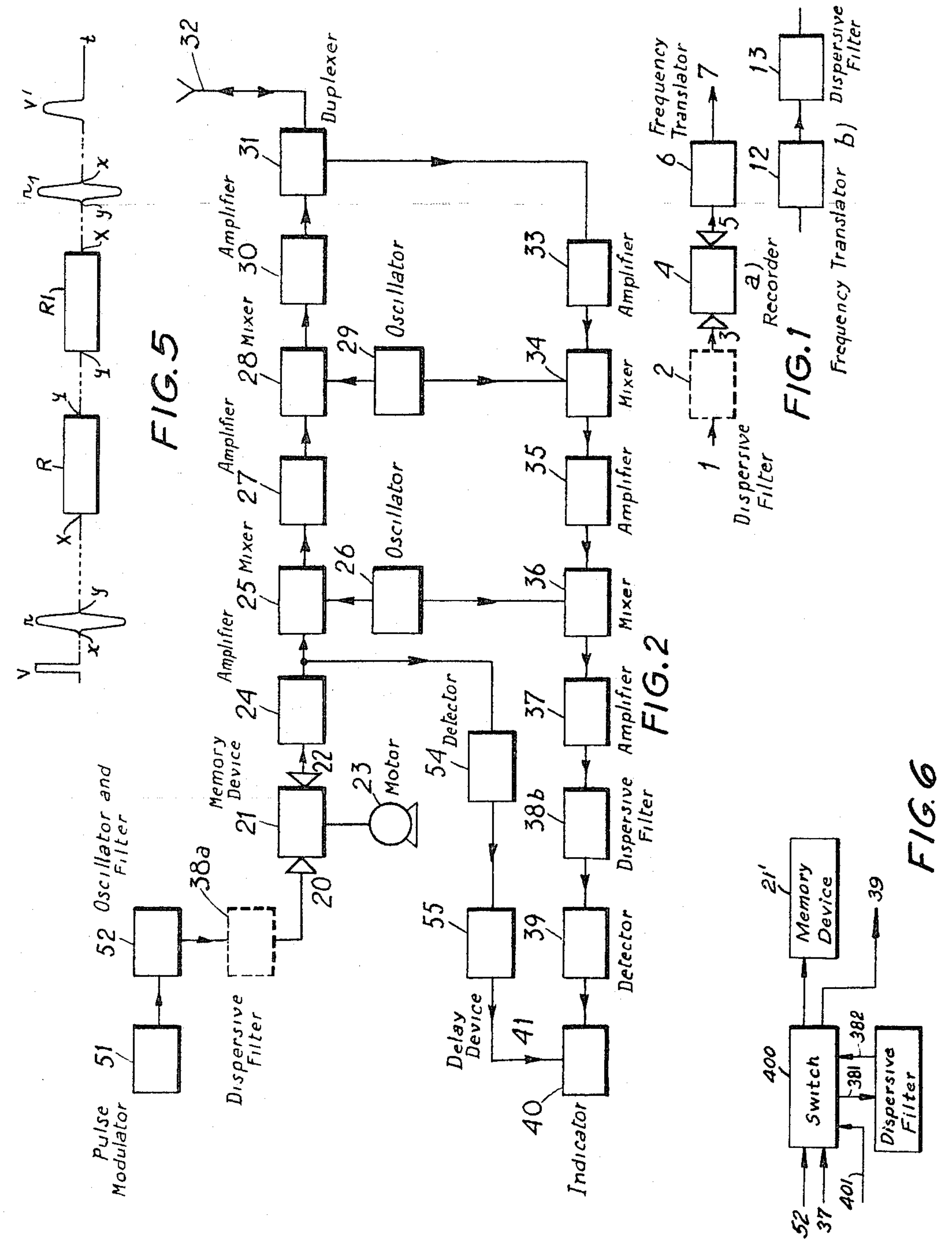
FIG. 1 is a block diagram of a system according to the invention.
FIG. 2 is a block diagram of a radar system incorporating the invention.
FIG. 5 is a graph illustrating the operation of the system of FIG. 2.
FIG. 6 shows a modification of part of the system of FIG. 2.

The method of the invention will now be described.

Let a short duration pulse which is formed, for example, by a train of constant amplitude oscillations of a fixed angular frequency $\omega_0$, be considered.

If this pulse is passed through a bandpass filter centered on frequency $\omega_0$, the spectrum of pulse $r$, thus obtained, will be given by the expression:

$$S=\int_{\omega_0-\frac{\Delta\omega}{2}}^{\omega_0+\frac{\Delta\omega}{2}} A(\omega)\cos\left[\omega t+\Phi(\omega)\right]d\omega \qquad (1)$$

where $A(\omega)$ and $\varphi(\omega)$ are respectively the amplitude and phase angle of the component having the angular frequency $\omega$.

The duration of this pulse remains short, if the band $\Delta\omega$ of the filter is wide enough. The pulse is then passed through a dispersive filter of characteristic $\varphi(\omega)$, which converts it into a longer, frequency modulated pulse R. Such filters are well known in the art.

The spectrum of pulse R is:

$$\Sigma=\int_{\omega_0-\frac{\Delta\omega}{2}}^{\omega_0+\frac{\Delta\omega}{2}} A(\omega)\cos\left[\omega t\Phi(\omega)+\varphi(\omega)\right]d\omega \qquad (2)$$

This pulse is recorded on a magnetic drum, or otherwise stored, in such a manner that the recorded information may be read in a direction which is the reverse of that of recording. Upon thus reading out the recorded pulse R, a pulse $R_1$ is made available, whose spectrum is obtained by making $t=-t$ in the expression (2), i.e. by writing $$\Sigma_1=\int_{\omega_0-\Delta\omega/2}^{\omega_0+\Delta\omega/2} A(\omega)\cos\left[-\omega t+\Phi(\omega)+\varphi(\omega)\right]d\omega$$

$$=\int_{\omega_0-\frac{\Delta\omega}{2}}^{\omega_0+\frac{\Delta\omega}{2}} A(\omega)\cos\left[\omega t-\Phi(\omega)-\varphi(\omega)\right]d\omega \qquad (3)$$

Several spaced pulses R may also be stored instead of a single pulse.

The recording of pulse R, thus obtained, may be used to obtain as many pulses $R_1$ as desired, unless the read-out operation is destructive of the information stored.

In order to be compressed, the long duration pulses $R_1$, the spectrum of which is $\Sigma_1$ to within a factor, are passed through the same dispersive filter which impresses on the spectrum components a phase shift $\phi(\omega)$.

At the output of the filter, pulses are then collected, the spectrum of which is, to within a factor, $$\int_{\omega_0-\Delta\omega/2}^{\omega_0+\Delta\omega/2} A(\omega)\cos\left[\omega t-\Phi(\omega)\right]d\omega \qquad (4)$$

It may be seen these pulses are identical, except for their amplitude, to pulses $r$ reversed with respect to time.

It has thus been shown that the dispersive filter combined with the recording device build up a system transforming a short pulse into a long pulse perfectly adapted for compression by means of the same dispersive filter, the function of the recording device being to derive pulse $R_1$ from pulse R, i.e., to reverse the latter with respect to time.

Of course the final result will not be modified if the dispersive filtering aimed at stretching pulses, is followed by one or more frequency changes, which may take place, before and/or after the recording and reading, provided that the algebrical sum of the frequency changes effected before the compression filtering is nil. Actually, a frequency change does not modify the relative phaseshifts between the various spectral components of the pulse. Stable heterodyning oscillators should, however, be used.

The method may also be carried into practice with a memory tube as a recording device, the reading out being in this case generally destructive of the stored information. Accordingly, a further identical filter is to be used for compressing, unless a switching system is provided for switching the dispersive filter between its pulse stretching and pulse compressing functions. FIG. 1 explains the principle of the invention. The device shown in this figure comprises at (*a*) a dispersive filter 2 having an input 1 to which a short pulse *r* is applied. The output of filter 2 is connected to the recording system 3 of a storage device 4, such as for example a magnetic drum, whose reader 5 is connected to an amplifier and, if desired, frequency translating system 6. A frequency translation bringing the frequency band of the signal to a higher frequency range may be desired, for example, for transmitting purposes. The frequency transmitting means may be of the conventional type comprising a mixer and a heterodyning oscillator.

The long duration pulses are collected at 7 for subsequent use.

The dispersive filter 2 has been shown in dotted lines to indicate that it is not necessarily a permanent element of the system shown at (*a*). Once a long duration pulse has been obtained from the given short duration pulse and recorded, the dispersive filter will be used only for compression purposes. Actually the system shown in the portion (*a*) of FIG. 1 is a system for elaborating long duration pulses which are capable of being properly compressed by means of the system shown in the portion (*b*) of FIG. 1.

This latter system includes a dispersive filter 13 which is either identical to or the same as filter 2. In this example, an amplifier and frequency translating stage 12 is provided, the frequency translation being the reverse of that performed at 6.

Of course, if the systems shown in portions (*a*) and (*b*) of FIG. 1 are located at the same spot, frequency translators 6 and 12 may have the same heterodyning oscillator.

The invention has the following advantages: The characteristic of the dispersive filter used is in no way critical, provided it insures the desired expansion of the pulse duration.

Accordingly, comparatively simple filters may be used for substantial frequency ranges, thus insuring a high degree of stretching and compression.

After the filter has been used for the recording of the long duration pulse, it is permanently available for effecting the compression of the pulses resulting from the repeated reading of the recorded pulse, provided this reading does not wipe out the information, which condition may be readily fulfilled with storing means of the magnetic type.

There is nothing critical, in so far as the spectrum and the shape of the initial short duration pulse is concerned.

FIG. 2 illustrates a radar system incorporating the invention and including the device shown in FIG. 1. It is known in radar techniques to transmit comparatively long duration pulses, thus making it possible to operate with a lower peak pulse power and thereby considerably simplifying a number of technical problems. The echo pulses are compressed at the reception and this preserves the range measuring accuracy. The invention makes the application of this method substantially easier.

In the system of FIG. 2, short duration pulses are generated by means of a video pulse modulator 51 which amplitude modulates an oscillator followed by a passband filter, both designated by block 52. A short duration pulse, having an initial frequency of, for example, 200 kc./s., is thus provided; by initial frequency is meant that no frequency translation of the pulse has yet occurred. This pulse is applied to the input of a dispersive filter 38a which is shown in dotted line to indicate that it is inserted at this point only temporarily, in order to produce the initial long duration pulse, stored as indicated above, and thereafter permanently inserted, through a manual operation, in the receiving part of the radar, in the position shown in 38b.

The output of filter 38a is connected to a storage device, for example, the recording head 20 of a magnetic drum 21 which is driven by a motor 23, the direction of rotation of which may be reversed. The drum is equipped with a reproducing head 22.

Head 22 is connected to the radar transmitter which comprises, connected in series, an amplifier 24 operating at the initial frequency, a mixer 25 also coupled to a heterodyning oscillator 26, an intermediate frequency amplifier 27, a further mixer 28, also coupled to a heterodyning oscillator 29, an output amplifier 30. Amplifier 30 is connected to an aerial 32 through a duplexer 31, one output of which is coupled to the radar receiver. The latter comprises an amplifier 33, a mixer 34, also coupled to oscillator 29, an intermediate frequency amplifier 35, a further mixer 36, also coupled to oscillator 26, an amplifier 37, the dispersive filter 38b, a detector 39 and an indicator 40, for example, an oscilloscope. The output of amplifier 24 is connected, through a detector 54 and a delay device 55, to the scanning system 41 of oscilloscope 40.

The operation of the system shown in FIG. 2 will be explained with reference to FIG. 5 where the different pulses considered are represented as a function of time, those of said pulses which are trains of oscillations being only schematically represented by their envelope. The short duration A.-C. pulse *r* is obtained through amplitude modulating, by the video-frequency pulse V supplied by pulse modulator 51, the oscillation at the aforementioned initial frequency supplied by the oscillator of block 52, and applying the thus obtained A.-C. pulse to the bandpass filter of block 52; *x* and *y* respectively designate the beginning and end portions of pulse *r*.

The spectrum of the pulses thus provided is reduced by the passband filter included in this assembly. The short duration pulse *r* thus obtained is converted into a long duration pulse R by the dispersive filter, which is in its position 38a, and pulse R is then recorded on the magnetic drum 21. One or several pulses R may be recorded. Once this has been done, the dispersive filter is put into its position 38b.

The recorded pulse is read out by reader 22, with drum 21 rotating during the reading out in a direction which is the reverse of the recording direction to provide recurrent long duration pulses $R_1$ which are, for example, frequency modulated between the angular frequencies $$(\omega_0-\Delta\omega/2)=100 \text{ kc./s. and } (\omega_0+\Delta\omega/2)=300 \text{ kc./s.}$$

Pulses R and $R_1$ are shown in FIG. 5, X and Y respectively designating the beginning and end portions of pulse R, to which the end and beginning portions of pulse $R_1$ respectively correspond, since $R_1$ is pulse R reversed with respect to time. Each pulse $R_1$ is amplified in amplifier 24 and translated to the intermediate frequency in mixer 25, at the output of which it appears as a pulse whose carrier is frequency modulated about the central frequency $\omega_0+\omega_i$, $\omega_i$ being the frequency of oscillator 26, with a frequency deviation of $\Delta\omega/2$. After amplification in amplifier 27, a further frequency translation takes place in mixer 28, the carrier frequency becoming $\omega_0+\omega_i+\omega_H$, with the same frequency deviation, $\omega_H$ being the frequency of oscillator 29.

These pulses are then passed to aerial 32 through duplexer 31.

The echo pulses received are passed through duplexer 31 to amplifier 33, restored to the intermediate frequency in mixer 34, amplified by amplifier 35, restored to the initial frequency in mixer 36 and again amplified in amplifier 37.

The pulses at the input of filter 38*b*, have a spectrum which is identical, to within a constant factor, to that of pulse $R_1$. The pulses $r_1$ (FIG. 5) at the output of filter 38*b* are identical to pulse *r*, except that the amplitude may have varied and that they have been inverted with respect to time.

These pulses are detected in detector 39. The detected pulses V′ (FIG. 5) are applied to oscilloscope 40. The synchronizing pulses are derived from amplifier 24, detected by detector 54 and delayed by the delay device 55, which compensates for the delay between the leading edge of the received long duration pulses and the leading edge of the compressed pulses applied to the scanning system of the oscilloscope.

The radar system described can, of course, undergo many modifications which are obvious to those skilled in the art.

Thus, for instance, the frequency translation between the initial frequency and the transmission frequency may be effected with a number of mixers, which may vary with the difference between these two frequencies. For sake of simplicity, only two mixers have been illustrated. Also, as already mentioned, the recording is not effected necessarily at the initial frequency and may take place at any intermediate frequency.

As to the timer pulses, they may be obtained in any other manner. For example, they may be collected at any other point of the transmission channel, or else, they may be recorded at the video frequency on an auxiliary track of drum 21.

The recording system may be of any type capable of reproducing the recorded information in a direction which is the reverse of that of recording the same. However, if the reading is recording destructive, as is the case for many memory tubes, a short duration pulse is to be produced for each long duration pulse to be radiated. Accordingly, a fresh recording is each time necessary and a switching system is to be made available for switching filter 38 from its circuit position 38*a* to its circuit position 38*b*, unless two similar filters are used.

Such a switch 400 is shown in FIG. 6 for the case when for example storing means 21′ of the memory tube type are used. Input 381 and output 382 of dispersive filter 38 are connected to switch 400, which is on the other hand connected to circuit 52 (FIG. 2), to memory tube 21′, to amplifier 37 and to detector 39 (FIG. 2). Switch 400 is controlled on its control input 401 so as to connect alternately (*a*) filter input 381 to circuit 52 and filter output 382 to memory device 21′ and (*b*) filter input 381 to amplifier 37 and filter output 382 to detector 39.

It will be noted that several dispersive filters may be used to provide several long duration pulses all of which are stored. A switching system is then provided for selectively reading out these signals. The stored signals may also be obtained by combining or by juxtaposing the respective outputs of several dispersive filters.

These filters effect the selection at the reception thus enabling an easy correlation on the compressed pulses. The latter may be received simultaneously or with predetermined spacings.

Figure 3:
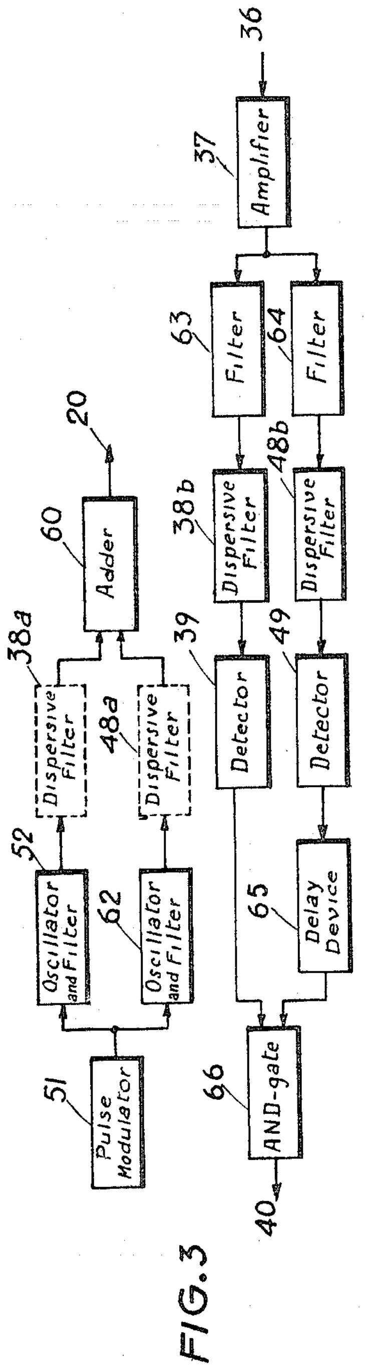
FIGS. 3 and 4 are diagrams of modified portions of the circuit of FIG. 2.

FIG. 3 shows, by way of example, how the circuit of FIG. 2 may be modified when two long duration pulses are recorded. These two pulses are obtained by means of two dispersive filters, namely filter 38 of FIG. 2 and an additional filter 48, which may have a phase shift characteristic different from that of filter 38.

The circuit of FIG. 3 comprises the pulse modulator 51 and the oscillator and passband filter assembly 52. A further assembly 62 is provided comprising an oscillator having an angular frequence $\omega'_0$ and a pass band $\omega'_0$ filter centered on this frequency. The oscillator of assembly 62 is also modulated by pulse modulator 51. The output pulses of assemblies 52 and 62 are respectively fed to dispersive filters 38 and 48 in their respective positions 38*a* and 48*a*. The outputs of filters 38*a* and 48*a* are added in a matched adder device 60, such as, for example, a transformer having two primary windings, respectively fed by the two dispersive filters and one secondary winding which feeds the recording head 20. The remainder of the transmitter circuit is exactly the same as in FIG. 2 and has therefore not been shown in FIG. 3.

The frequency difference between frequencies $\omega_0$ (frequency of the oscillator of block 52) and $\omega'_0$ is selected to be such that the two corresponding long duration pulses may be readily filtered.

The receiver circuit is the same as that shown in FIG. 2, except for the portion thereof which will be described and which is the only one shown in FIG. 3. The output of amplifier 37 feeds two filters 63 and 64, which filter the two long duration pulses received and feed them respectively to dispersive filters 38*b* and 48*b*. If necessary a delay device 65 is coupled to the output of the detector which detects that pulse which was delayed the least, for example detector 49, in order to cause the two pulses to coincide in time.

The outputs of detector 39 and delay device 65 are respectively connected to the inputs of a correlating device, such as for example an AND-gate 66, whose output feeds indicator 40.

It is to be noted that, when the radar is used for detecting high radial speed targets, the variation of angular frequency $\omega_d$, due to the Doppler effect, which substantially the same for all the frequencies of the pulse spectrum, since the frequency deviation is small compared to the central transmission frequency, is tantamout to a mere translation of this frequency, each elementary component becoming then:

$$A(\omega)\cos[(\omega+\omega_d)t-\Phi(\omega)-\varphi(\omega)]d\omega \qquad (5)$$

However, the passage through the dispersive filter affects each component with phaseshift $\varphi(\omega+\omega_d)$ instead of $\varphi(\omega)$. Consequently, if $\varphi(\omega+\omega_d)-\varphi(\omega)$ is not equal to $K'(\omega+\omega_d)+K''$, where K′ and K″ are constants, i.e. if the derivative $$d\varphi/d\omega$$

departs substantially from a function of the first degree, the compression filtering will be distorted, thus reducing the compression degree and the useful energy.

If the number of pulses impringing upon the target is high, say for example a hundred the Doppler effect may be compensated for by acting on the frequency of one of the receiver heterodyning oscillators. In this case, separate heterodyning oscillators are to be used for the corresponding mixers of the receiver and the transmitter. The frequency of the heterodyning oscillator concerned may be modulated stepwise, each step covering the transmission of about ten pulses, the difference between the frequency of each step and the normal frequency of the heterodyning oscillator being equal to an assumed Doppler frequency and the time interval covering the whole step by step cycle being equal to the time corresponding to the transmission of about a hundred pulses in the example given. The modulating frequency may also be a sinusoid the period of which is equal to that of the stepped cycle of the previous example. The maximum frequency deviation with respect to the central frequency is taken equal to the assumed maximum radial speed of the target.

Figure 4:
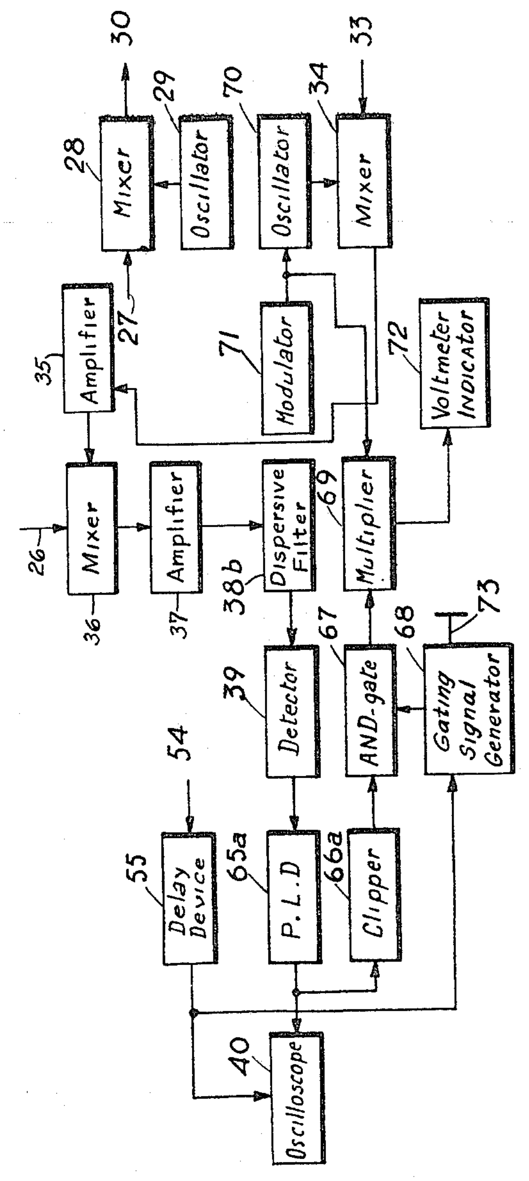

FIG. 4 shows how the circuit of FIG. 2 is to be modified when high radial speed targets are concerned. Only the modified portion of FIG. 2 has been shown.

In this case, one of the receiver mixers, preferably the first one, i.e. mixer 34, is fed by an heterodyning oscillator 70, which is different from that feeding the transmitter mixer 28.

Oscillator 70 is frequency modulated in the above described step by step manner by a modulator 71, which delivers to this effect a signal the level of which varies stepwise.

Those echo-pulses, which are received at the moment when there is compensation between the variation of the frequency of oscilaltor 70 and the Doppler frequency of the target, are compressed in a normal manner and are the only ones to be applied to the oscilloscope 40 by pulse length discriminator circuit, commonly referred to as a P.L.D., 65*a* which is inserted between detector and oscilloscope 40.

This system also makes it possible to determine the radial speed of the target. To this end, an auxiliary circuit is used which is also connected to the P.L.D. circuit 65*a*. This circuit comprises a clipper 66*a* which equalizes the amplitudes of all the output pulses of circuit 65*a*, a multiplier circuit 69 having one input receiving the modulating signals of modulator 71 and one input receiving the output signals of clipper 66*a*. The output of circuit 69 feeds a peak voltmeter 72. The speed of the target is thus measured by determining the modulating voltage of oscillator 70 at the moment the target is detected.

As a plurality of targets may coexist, it is preferred, and this has been done in FIGURE 4, to insert between clipper 66*a* and multiplier 69 and AND-gate 67, the other input of which is used to tell the echoes received from one target from those received from other targets by distinguishing them as a function of a coordinate of the targets. In the example considered, it has been assumed that gate 67 is a distance gate and receives at the above other input the gating signals from a gating signal generator 68, which is controlled by the same synchronizing signal as oscilloscope 40 and is also manually controlled by the operator at 73 in such a manner that only those output signals from clipper 66*a* pass gate 67 which correspond to a target which is at a given distance interval from the radar system.

It is to be understood that the invention is in no way limited to the examples shown and illustrated, when were given only by way of example.

What is claimed is:

1. A system, comprising a dispersive filter, for providing pulses capable of being compressed by means of said dispersive filter, said system comprising: means for providing first short A.-C. pulses capable of being stretched by means of said dispersive filter; means for feeding said short pulses to said dispersive filter for providing second pulses; storing means having an output and including means for recording said second pulses in a first direction and means for reading the recorded pulses in a second direction opposite to said first direction, thus making compressible long pulses available at said output.

2. A system, comprising a dispersive filter, for providing pulses capable of being compressed by means of said filter and for compressing said pulses, said system comprising: means for providing short A.-C. pulses capable of being stretched by means of said filter; storing means capable of recording information in a first direction and restituting the recorded information in a second direction, opposite to said first direction; means for feeding said short pulses to said dispersive filter; means for coupling said storing means to said dispersive filter for recording in said first direction; means for coupling said storing means to said dispersive means for restituting the recorded information in said second direction; and means for collecting the output signal of said dispersive filter.

3. A system for providing compressed pulses comprising: means for providing short A.-C. pulses; dispersive filter means adapted for stretching said pulses; storing means capable of recording information in a first direction and restituting the recorded information in a second direction, opposite to said first direction, said storing means having an input and an output; means for coupling said dispersive filter between said pulse providing means and said storing means input for stretching said pulses and recording the stretched pulses; means for coupling said storing means output to said dispersive filter means for reading out the recorded pulses and compressing the read pulses; and means for collecting the compressed pulses.

4. A radar comprising: means for generating short A.-C. pulses; a bandpass filter coupled to said generating means for filtering said pulses; a dispersive filter adapted for stretching the output pulses of said bandpass filter; storing means capable of recording information in a first direction and restituting the recorded information in a second direction, opposite to said first direction, said storing means having an input and an output; a transmitter, including amplifying means and frequency translating means, coupled to said storing means output; an aerial coupled to said transmitter for transmitting pulses and receiving echo pulses; a receiver coupled to said aerial and including amplifying and frequency translating means; a detector and indicator means coupled in series and means for selectively coupling said dispersive filter (*a*) between said bandpass filter and said storing means input and (*b*) between said receiver and said detector.

5. A radar system comprising: means for generating short pulses; a dispersive filter for stretching said pulses; storing means capable of recording information in a first direction and restituting the recorded information in a second direction, opposite to said first direction, said storing means having a recording input and a restituting output; a transmitter-receiver system having a transmitter input coupled to said storing means output and a receiver output; a detector, and indicator means coupled in series; and means for selectively coupling said dispersive filter (*a*) between said pulse generating means and said storing means input and (*b*) between said receiver output and said detector.

6. A radar comprising: means for providing short A.-C. pulses; a dispersive filter adapted for stretching said pulses; a magnetic drum, including a recorder head and means for reading the recorded information in a direction opposite to that of recording; a transmitter, including amplifying means and frequency translating means, coupled to said magnetic drum reading means; an aerial coupled to said transmitter for transmitting pulses and receiving echo pulses; a receiver coupled to said aerial and including amplifying and frequency translating means; a detector and indicator means coupled in series; and means for selectively coupling said dispersive filter (*a*) between said pulse providing means and said recorder head and (*b*) between said receiver and said detector.

7. A radar system comprising: means for providing short A.-C. pulses; a dispersive filter adapted for stretching said pulses; storing means capable of recording information in a first direction and restituting the recorded information in a second direction, opposite to said first direction said storing means having an input and an output; a transmitter including amplifying means and frequency translating means coupled to said storing means output; an aerial coupled to said transmitter for transmitting pulses and receiving echo pulses; a receiver coupled to said aerial and including amplifying and frequency translating means, said translating means including at least one heterodyning oscillator independent of said transmitter; means for stepwise modulating said oscillator; a detector, a pulse length discriminator having an output and indicator means coupled in series, means for selectively coupling said dispersive filter (*a*) between said pulse providing means and said storing means input and (*b*) between said receiver and said detector; a clipper, a multiplier having two inputs, respectively coupled to said modulator and said clipper and an output; and a peak voltmeter coupled to said output, said clipper having an input coupled to said pulse length discriminator.

8. A radar system comprising: means for generating short A.-C. pulses; a bandpass filter coupled to said pulse generating means for filtering said pulses; a dispersive filter adapted for stretching the output pulses of said bandpass filter; storing means of the magnetic type capable of recording information in a first direction and restituting the recorded information in a second direction, opposite to said first direction, said storing means having and input and an output; a transmitter including amplifying means and frequency translating means coupled to said storing means output; an aerial coupled to said transmitter for transmitting pulses and receiving echo pulses; a receiver coupled to said aerial and including amplifying and frequency translating means, said translating means including at least one heterodyning oscillator independent of said transmitter; means for stepwise modulating said oscillator; a detector, a pulse length discriminator having an output and indicator means coupled in series; means for selectively coupling said dispersive filter ($\alpha$) between said bandpass filter and said storing means input and ($b$) between said receiver and said detector; a clipper, a multiplier having two inputs, respectively coupled to said modulator and said clipper, and an output; a peak voltmeter coupled to said output; and an AND-circuit having a first input and an output, respectively coupled to said clipper and said multiplier, and a second input; and a gating signal generator coupled to said second input, said clipper having an input coupled to said pulse length discriminator.

9. A radar system comprising: a dispersive filter having an input and an output; means for generating short A.-C. pulses adapted for being stretched by said dispersive filter; storing means for writing a signal in said storing means in one direction and means for reading said signal in the opposite direction, said storing means being of the type where the reading operation destroys the recorded information; transmitting means, including frequency translating means, coupled to said reading means; an aerial coupled to said transmitting means; receiving means coupled to said aerial; detecting means; indicating means coupled to said detecting means; and switching means for alternately coupling ($a$) said dispersive filter input to said pulse generating means and said dispersive filter output to said writing means and ($b$) said dispersive filter input to said receiving means and said dispersive filter output to said detecting means.

10. A radar system comprising: $n$ first channels in parallel, $n$ being an integer, said channels respectively including means for providing respective short A.-C. pulses; $n$ dispersive filters respectively associated with said $n$ first channels and respectively adapted for streching said short pulses provided in said associated channels and supplying respective longer pulses having respective frequency bands respectively corresponding to said $n$ dispersive filters; an adder circuit coupled to said channels; storing means of the magnetic type capable of recording information in a first direction and restituing the recorded information in a second direction, opposite to said first direction, said storing means having a recording input coupled to said adder and an output; a transmitter coupled to said storing means output, said transmitter including amplifying means and frequency translating means; an aerial coupled to said transmitter for transmitting pulses and receiving echo pulses, a receiver coupled to said aerial and including amplifying and frequency translating means; $n$ second channels in parallel respectively associated with said $n$ dispersive filters, said $n$ second channels being coupled to said receiver, and including respective filters for filtering the frequency bands corresponding to said associated dispersive filters, and detectors; means for selectively coupling each of said dispersive filters ($a$) between said pulse providing means of said associated first channel and said adder circuit and ($b$) between said band filtering filter and said detector of said associated second channel; an AND-circuit having $n$ inputs and one output; means for feeding simultaneously the respective outputs of said second channels to said AND-circuit inputs; and indicator means coupled to said AND-circuit output.

References Cited by the Examiner

UNITED STATES PATENTS

| | | |
|---|---|---|
| 2,624,876 | 1/1953 | Dicke. |
| 2,678,997 | 5/1954 | Darlington. |
| 2,753,448 | 7/1956 | Rines. |

OTHER REFERENCES

Cook: "Pulse Compression—Key to More Efficient Radar Transmission," Proc. IRE, March 1960, pp. 310–316.

CHESTER L. JUSTUS, *Primary Examiner.*

L. H. MYERS, R. D. BENNETT, *Assistant Examiners.*